June 6, 1933. R. H. BROCKMAN 1,913,261
LATHE TOOL HOLDER
Filed May 26, 1932
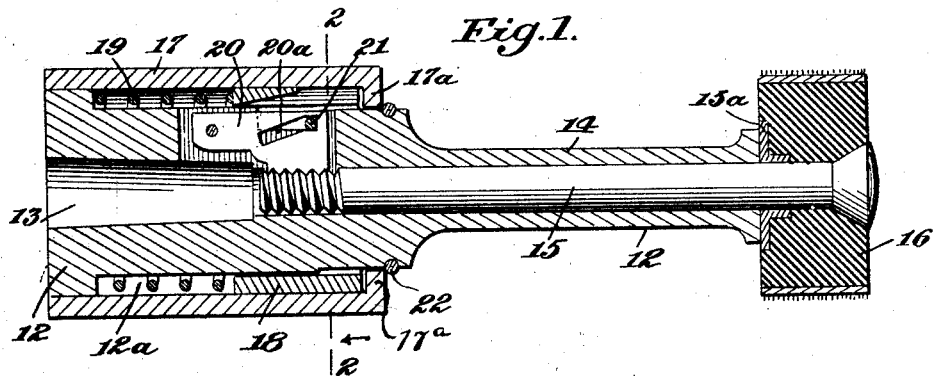
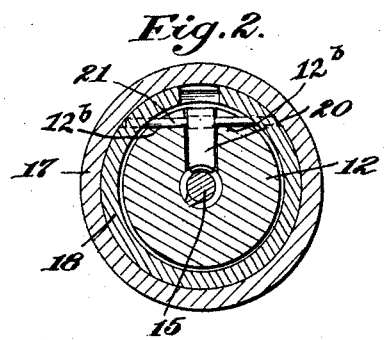
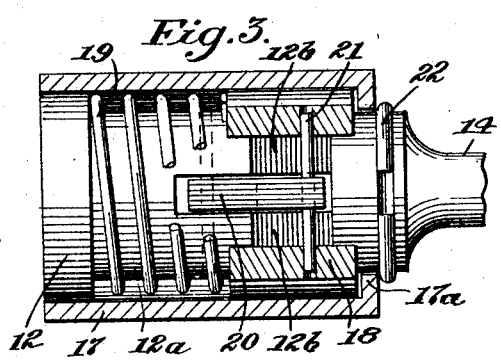
Inventor:
Robert H. Brockman Patented June 6, 1933

1,913,261

UNITED STATES PATENT OFFICE

ROBERT H. BROCKMAN, OF ST. PETERSBURG, FLORIDA

LATHE TOOL HOLDER

Application filed May 26, 1932. Serial No. 613,746.

This invention relates to a lathe chuck or tool holder which is an improvement on the device shown and described in my U. S. Patent No. 1,839,139, dated December 29, 1931, and has for its object to provide a chuck or tool holder, of the class referred to, which will be simple in construction and efficient in operation.

In the accompanying drawing Fig. 1 is a longitudinal section of my improved tool holder, and Fig. 2 is a cross section of the same on line 2—2, Fig. 1. Fig. 3 is a partial horizontal section looking from the top of Fig. 1.

Referring to the drawing, 12 denotes a body or holder having a slightly tapering axial recess 13 which is intended to receive the end of a lathe spindle. Integral with the holder part 12 is a hollow part or sleeve 14 in which fits a spindle 15 on which an abraiding wheel 16 or other element, such, for example, as the cleaning brush 26 shown in the drawing of my said patent, is mounted. A metal washer 15$^a$ is preferably interposed between the end of the tubular part or sleeve 14 and the rubber body of the abraiding wheel 16 to protect the rubber part 12 from wear.

Fitting loosely around the holder part 12 is an outer sleeve 17 which will preferably have a knurled or otherwise roughened outer surface, said sleeve having an inturned flange 17$^a$. The holder 12 has an annular recessed part 12$^a$ between which and the sleeve 17 fits a sliding inner sleeve 18, and in said recessed part 12$^a$ is a spiral spring 19 which abuts against the inner end of said sleeve 18, urging said sleeve 18 towards the flange 17$^a$ of the sleeve 17.

Pivoted in a suitable recess in the holder 12 is a dog 20 provided with a slot 20$^a$ which receives a cross pin 21 mounted on the sleeve 18. The said slot 20$^a$ is partly inclined relative to the axis of the holder and is partly parallel with said axis, so that when the sleeves 17 and 18 are moved to the left (Fig. 1) said dog 20 will be disengaged from the inner end of the spindle 15 which is screw-threaded or otherwise roughened for holding engagement with said dog. When the dog is engaged said spindle and the pin 21 is in the parallel part of the slot 20$^a$ said dog will be locked in holding engagement with the said spindle.

The slot 20$^a$ is preferably closed at the free end of the dog 20, as shown, so that the wall at said end will serve as a stop for the sliding movement of the sleeve 18 and the pin 21. The body 12 is partly cut away and flattened at 12$^b$ at the sides of the recess in which the dog 20 works, said flattened parts 12$^b$, over which the pin 21 slides, serving to prevent turning movements of the sleeve 18.

The sleeve 17, in the construction shown, is held on the body 12 by an annular stop 22 afforded by a removable split spring ring 22 fitting in a recess in the said body.

From the foregoing it will be understood that when a tool spindle 15 is inserted in the hollow part or sleeve 14 the dog 20, urged into operative position by the stress of the spring 19 against the sleeve 18, will engage the threaded or roughened inner part of said spindle and thus secure the same in the holder. To release the spindle 15 the sleeve 17 is moved longitudinally against the stress of the spring 19, the flange 17$^a$ on said sleeve engaging the sleeve 18 so that the cross pin 21 on said sleeve 18, working in the inclined part of the slot 20$^a$, will lift the dog 20 out of engagement with the roughened part of the spindle 15 to release the said spindle and the abrading or cleaning element carried thereby from the holder, as above stated.

From the foregoing it will be understood that the invention provides a simple and effective lathe tool holder from which the tool may be released or inserted while the holder is running, as with the tool holder of my said Patent No. 1,839,139, by moving the outer sleeve 17 longitudinally of the holder.

Having thus described my invention I claim and desire to secure by Letters Patent:—

1. A lathe tool holder comprising a recessed body and a hollow part to receive a tool, an outer sleeve loosely fitting said body and having an in-turned flange, an inner sleeve interposed between said body and said outer sleeve, a coil spring abutting against said inner sleeve, a cross pin mounted on said inner sleeve, and a pivoted dog mounted in a recess in said body and arranged to engage the shank or spindle of a tool, said dog having a slot in which said pin works.

2. A lathe tool holder comprising a recessed body and a hollow part to receive a tool, an outer sleeve loosely fitting said body and having an in-turned flange, an inner sleeve, a coil spring abutting against said inner sleeve, a cross pin mounted on said inner sleeve, and a pivoted dog mounted in a recess in said body and arranged to engage the shank or spindle of a tool, said dog having a slot in which said pin works, said body having flattened parts adjacent to said pin and which prevent said inner sleeve from turning.

3. A lathe tool holder, comprising a recessed body and a hollow part to receive a tool, an outer sleeve loosely fitting said body and having an in-turned flange, an inner sleeve interposed between said body and said outer sleeve, a coil spring abutting against said inner sleeve, a cross pin mounted on said inner sleeve, a pivoted dog mounted in a recess in said body and arranged to engage the shank or spindle of a tool, said dog having a slot in which said pin works, said slot being partly inclined relative to the longitudinal axis of said holder and partly parallel to said axis.

In testimony whereof I affix my signature.

ROBERT H. BROCKMAN.